Figure 1:
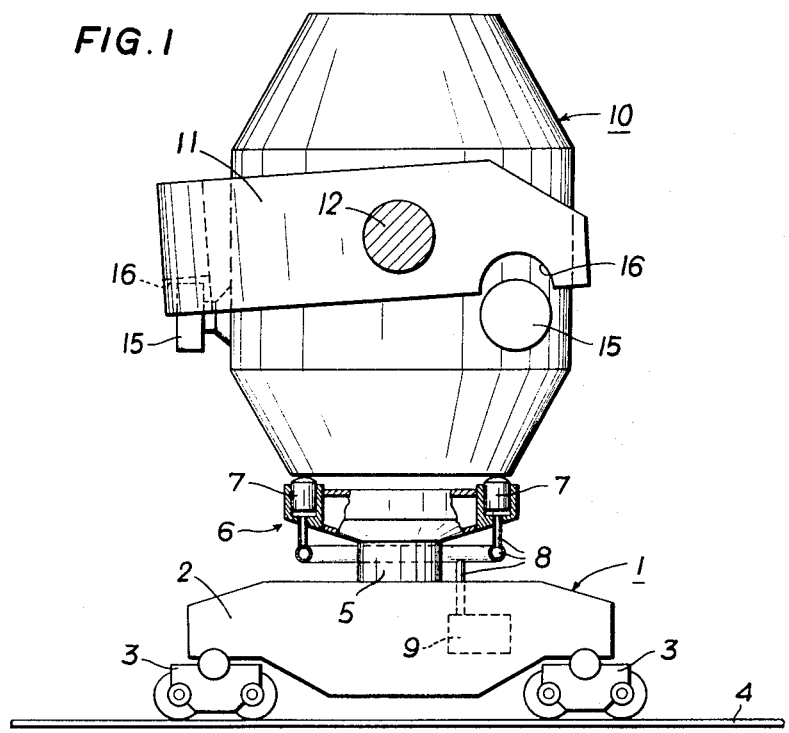

United States Patent [19]
Spannlang

[11] 3,741,407
[45] June 26, 1973

[54] CONVERTER HANDLING VEHICLE

[75] Inventor: Ronald Spannlang, Linz-Ebelsberg, Austria

[73] Assignee: Vereinigte Osterreichische Eisen-und Stahlwerke Aktiengesellschaft, Linz, Austria

[22] Filed: Aug. 2, 1971

[21] Appl. No.: 167,936

[30] Foreign Application Priority Data
Aug. 6, 1970   Austria.................................... 7154

[52] U.S. Cl............................................... 214/1 D
[51] Int. Cl............................................... C21c 1/00
[58] Field of Search..................... 214/1 D; 266/35; 105/177, 238

[56] References Cited
UNITED STATES PATENTS
3,312,544   4/1967   McCready et al............. 105/177 X
3,434,606   3/1969   Asamura......................... 105/177 X
3,144,496   8/1964   Langlitz......................... 214/1 Q X FOREIGN PATENTS OR APPLICATIONS
1,500,012   9/1967   France............................... 214/1 D Primary Examiner—Gerald M. Forlenza
Assistant Examiner—Frank E. Werner
Attorney—Granville M. Brumbaugh, Arthur S. Tenser and John A. Artz et al.

[57] ABSTRACT

The invention relates to a converter handling vehicle for transporting a converter and for positioning a converter into and removing it from a tiltable carrying ring, comprising a vehicle frame arranged on bogies, a liftable and lowerable carrying platform, a plurality of hydraulically operable lifting aggregates for receiving the converter and pressure spaces in said aggregates communicatingly connected by a common conduit for supplying a pressure agent. By means of these lifting aggregates it becomes possible to adapt the converter to an inclined or slanting position of the carrying ring when the converter is being put into position.

2 Claims, 4 Drawing Figures

CONVERTER HANDLING VEHICLE

The invention relates to a converter handling vehicle for transporting a converter and for removing a converter into or out of a tiltable carrying ring, comprising a vehicle frame arranged on bogies and a liftable and lowerable, if desired rotatable, carrying platform.

Converters for converting pig iron to steel in the basic oxygen process are exposed to great stress so that the refining vessel has to be refractorily relined about every 10 work days. According to the converter size lining takes two to three days; during this time the steel production is interrupted. It has therefore been proposed to reline a refining vessel not at the site, i.e., in the blowing stand, but to remove the converter from its carrying ring and to transport it to a lining stand, and to place into the carrying ring a second vessel which had been removed before and is ready for operation so that the steel production has to be interrupted only for a few hours. For this converter exchange heavy converter handling vehicles are used which are provided with a carrying platform for receiving the converter. The carrying platform has to be liftable and lowerable and rotatable around the vertical axis of the converter so that adjusting movements may be carried out when the converter is removed in or out of the carrying ring.

Ordinarily in steel works in which such exchange of converters is carried out, horseshoe-shaped carrying rings are used so that the converter may be driven out of the blowing stand in horizontal direction without having to be lowered after the connection with the carrying ring is released. With such carrying rings open on one side the converter as a rule is fixed to the upper side of the carrying ring; there recesses are provided into which supporting elements projecting from the converter wall engage and then may be locked in these recesses. When the converter is supported on three points of the carrying ring the weight of the converter guarantees that all supporting elements are in contact with their corresponding supporting planes so that no play is created which later, when positioning is finished and the converter is in function, could lead to severe shocks during tilting of the converter and to the destruction of the converter bearing.

According to recent suggestions in the development of the construction of so-called exchange converter plants, the converter is fixed to the carrying ring at its lower side. This has the advantage that the converter may be put into position from below also in the case of carrying rings which are closed around their circumference. As compared to carrying rings open on one side, closed carrying rings have the great advantage of higher stability and retention of shape; therefore they may also be used for big and heavy converters which earlier could not be designed as exchange converters. When the supporting elements are fixed to the bottom side of a converter ring difficulties are created in so far as the carrying ring cannot always be adjusted to be exactly horizontal. Thus it is necessary to be able to adapt the converter or its supporting elements, respectively, to the inclination of the carrying ring.

The invention is aimed at creating a converter handling vehicle by means of which it becomes possible to adapt the converter to an inclined or slanting carrying ring while the converter is being put into position. This task is fulfilled in a converter handling vehicle of the kind defined in the introduction in that for receiving the converter several lifting aggregates are provided which are distributed around the circumference of the carrying platform and may be hydraulically actuated and whose pressure spaces are communicatingly connected by a common conduit for the supply of a pressure agent.

Figure 2:
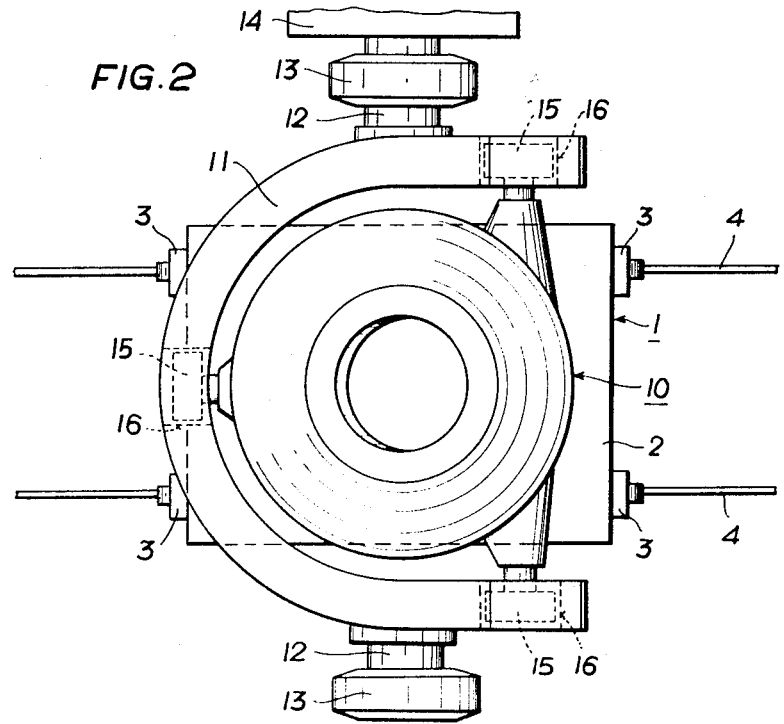
Figure 3:
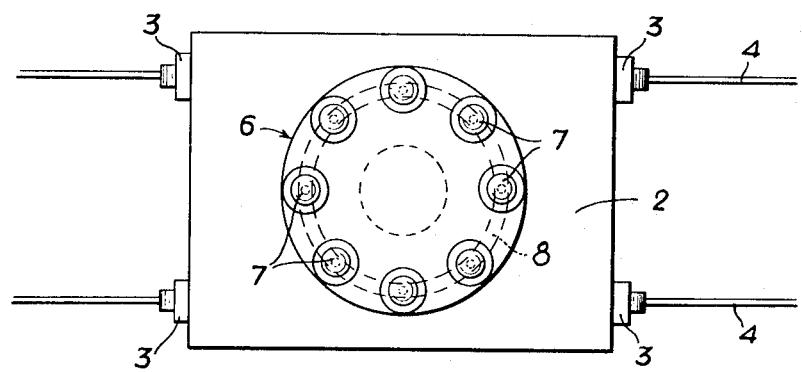
Figure 4:
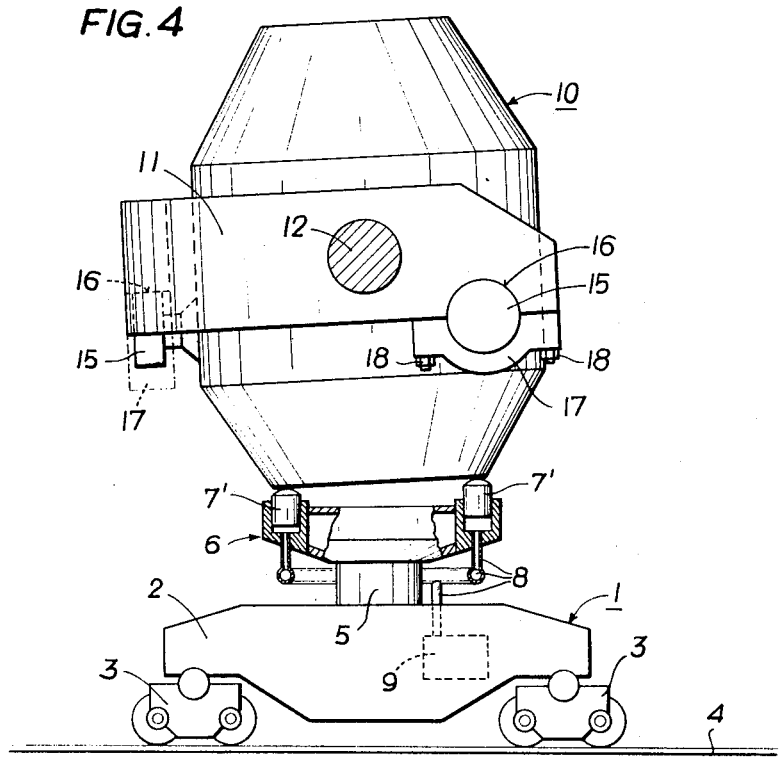

In order that the invention may be more fully understood, an embodiment thereof shall now be explained with reference to the accompanying drawings. FIG. 1 is a lateral view of the converter handling vehicle according to the invention with a converter and a carrying ring, the carrying platform being partly in section. FIG. 2 is a top view and FIG. 3 is the ground plan of the converter handling vehicle without converter. FIG. 4 shows the converter handling vehicle with converter and carrying ring corresponding to FIG. 1, but the converter is in a position which is adapted to the inclination of the carrying ring.

In FIG. 1, numeral 1 denotes the converter handling vehicle as a whole. It comprises essentially a vehicle frame 2, bogies 3 having wheels running on rails 4, a hydraulically operable lifting device 5 and a carrying platform 6, which may be rotatable, connected with said device. Numeral 7 denotes several lifting cylinders which are distributed along the circumference of the carrying platform 6 at equal intervals and are hydraulically operable and whose pressure spaces are communicatingly connected by a conduit 8. The pressure agent is supplied into the conduit 8 through a hydraulic pump 9.

The converter 10 rests on the pistons of the lifting devices 7 which are arranged along a circle; in the first phase of positioning the converter, the pistons are completely drawn in, i.e., they contact the cylinder floors. Numeral 11 denotes a slanting converter ring on which tilting trunnions 12 are fixed. The tilting drive 14 acts on the tilting trunnions 12 which are arranged in bearings 13 (FIG. 2). Three supporting elements 15 project from the converter shell; their ends are to be inserted into pocket-like recesses 16 at the lower side of the carrying ring 11. When the converter is put into position, at first the lifting cylinder 5 is actuated until the converter 10 gets into the position illustrated in FIG. 1. Then the lifting cylinders 7 arranged on the carrying platform 6 are actuated so that the converter 10 is moved into the final position illustrated in FIG. 4; the lifting cylinders with pushed out pistons are denoted with 7'. Since the pressure spaces of the lifting cylinders 7 are communicatingly connected, the converter 10 is so to say arranged to be floating and adapts automatically exactly to the slanting carrying ring 11. As soon as the supporting elements 15 engage with the pocket-like recesses 16 the handles 17 illustrated in FIG. 4 may be fixed on the carrying ring 11 by means of suitable connecting means such as screws or tie rods; the connecting means are denoted by numeral 18. When the converter is fixed to the carrying ring the pistons of the lifting cylinders 7 are drawn in and the converter handling vehicle may be driven out of the blowing stand.

What is claimed is:
1. A converter handling vehicle for transporting a converter and for positioning a converter into and removing it from a tiltable carrying ring, comprising
   a. a vehicle frame arranged on bogies,
   b. a carrying p'atform connected to the frame, c. means for lifting and lowering the carrying platform,
d. a plurality of hydraulically operable lifting means positioned around the circumference of the carrying platform adapted to contact the converter, and
e. channel means in communication with the lifting means on the carrying platform, the channel means being communicatingly connected to a common conduit for accurately positioning a converter in the carrying ring.

2. The converter handling vehicle set forth in claim 1, wherein the carrying platform is rotatable.

* * * * *